United States Patent [19]

Takano et al.

[11] Patent Number: 4,493,037
[45] Date of Patent: Jan. 8, 1985

[54] RETAIL TERMINAL

[75] Inventors: Kazukiyo Takano, Seto; Keigi Koga, Isehara, both of Japan

[73] Assignee: Hitachi, Ltd., Tokyo, Japan

[21] Appl. No.: 327,628

[22] Filed: Dec. 4, 1981

[30] Foreign Application Priority Data

Dec. 10, 1980 [JP] Japan ............................. 55-173281

[51] Int. Cl.³ ............................................. G06F 13/00
[52] U.S. Cl. ................................... 364/405; 364/404; 364/406; 364/900
[58] Field of Search ............... 364/403, 404, 405, 406, 364/900, 200

[56] References Cited

U.S. PATENT DOCUMENTS

| | | | |
|---|---|---|---|
| 3,784,802 | 1/1974 | Imai et al. | 364/403 |
| 3,905,022 | 9/1975 | Klosky et al. | 364/900 |
| 4,095,738 | 6/1978 | Masuo | 364/405 |
| 4,135,250 | 1/1979 | Hirano | 364/900 |
| 4,159,533 | 6/1979 | Sakurai | 364/900 |

Primary Examiner—Jerry Smith
Assistant Examiner—Karl Huang
Attorney, Agent, or Firm—Antonelli, Terry & Wands

[57] ABSTRACT

A retail terminal to register merchandise data such as a price of merchandise, amount of merchandise, a merchandise code and a merchandise name in a department store or a retail store is disclosed. The retail terminal includes a data buffer for temporarily storing the merchandise data of a plurality of items of merchandise item by item, the merchandise data stored item by item are summed upon the depression of a total key when the account for a customer has been completed and the sum is stored in a memory. Upon the depression of a correction key, the data temporarily stored in the data buffer are sequentially and retrogressively cleared item by item. In this manner, the correction for the plurality of items of merchandise is simplified.

2 Claims, 3 Drawing Figures

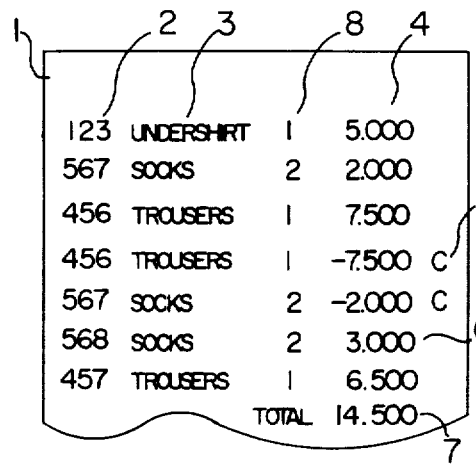
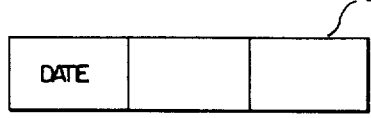
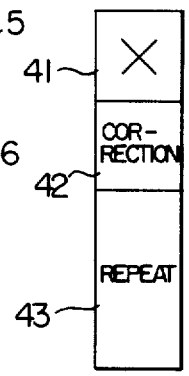
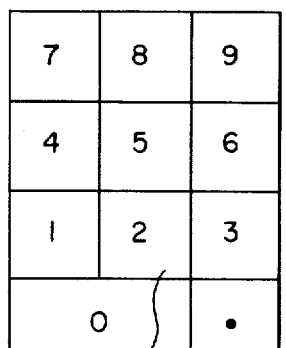
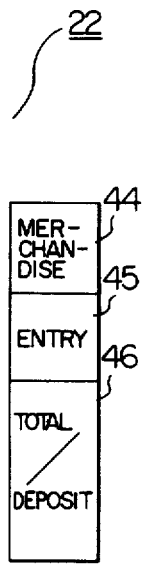
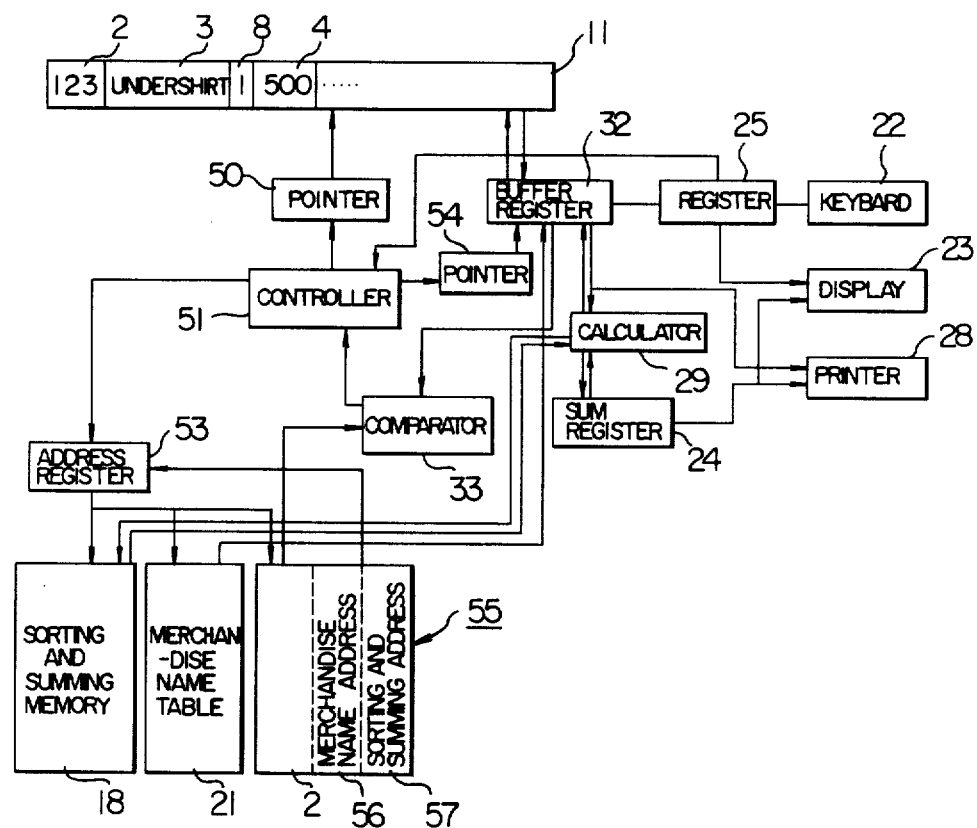

4,493,037

RETAIL TERMINAL

BACKGROUND OF THE INVENTION

The present invention relates to a retail terminal, and more particularly to an improvement in a registration function in a retail terminal such as an electronic cash register.

Cash registers have been installed in department stores and retail stores and used to record merchandise prices, amounts of merchandise, merchandise sort codes, merchandise names and dates in duplicates and issue receipts of the same contents to customers. In such cash registers, if an operator misoperates or some situation change takes place on a part of the customer, the numeric data entered must be corrected. One example of a correction method is disclosed in Japanese Pat. Appln. Post-Exam Publn (Kokoku) No. 46467/1977, in which the status of a discrimination circuit immediately before the depression of a clear key is determined to correct and erase entry data and correct entered data, and an error mark is added to an erroneous printout on a receipt and correct data is printed on a line next to the last printed line.

In another known method, the cancellation of entered data is allowed within a limit of a number of repeated times in a cash register having a repeat function. An error mark is added to an erroneous printout and correct data is printed on a line next to the last printed line. In both methods, an add/subtract circuit for sequentially accumulating input amounts of money keyed in by keys is provided, and the correction of merchandise data keyed in several cycles earlier than a current cycle is carried out by keying in cancellation data. In the known methods, therefore, since the erroneous data can be cancelled without reentering the cancellation data, the occurrence of double error due to misoperation in entering the cancellation data is prevented. However, in the known methods, only the data for the immediately preceding item can be corrected.

It is desirable that the cancelled item on a receipt to be deliverd to a customer or on a sales slip is crossed out by a line. Since the sales slip has print items preprinted thereon and has a limited number of lines, it is not desirable to print the correct data on a different line as is done in the prior art system.

SUMMARY OF THE INVENTION

It is an object of the present invention to provide a retail terminal in which input merchandise information is sequentially stored in an input data buffer and a total is calculated upon the depression of a total key and input merchandise information can be sequentially and retrogressively cancelled for each item upon depression of a correction key.

The present retail terminal comprises input means for inputting information including at least a merchandise code, the cost of merchandise and the amount of merchandise, a first register for storing the information including the merchandise code, the cost and the amount of merchandise, for each item of the merchandise, supplied from the input means, a second register for sequentially storing the content of the first register for respective items of the merchandise, a name table for storing the merchandise codes and corresponding merchandise names, a memory for storing sums of amounts of money for items sold and sums of amounts of merchandise sold for the respective merchandise sorts and a calculation unit for carrying out arithmetic operations on the cost of merchandise and the amounts of merchandise.

When the merchandise data stored in the first register for each item of the merchandise is transferred to the second register, the merchandise name corresponding to the merchandise code stored in the first register is read out of the name table and the merchandise name is stored in the second register together with the data stored in the first register. In this manner, the data on a plurality of items of the merchandise are sequentially stored in the second register. When the store operation, that is, inputting of merchandise data for a customer is completed, a total key is depressed and the merchandise data stored in the second register is sequentially read out and the costs and the amounts of merchandise are calculated by the calculation unit. The sums of the costs and the sums of the amounts of merchandise for the respective items of the merchandise are stored in the sorting and summing memory. When a receipt printer is included, the registered data for the respective items of the merchandise and the total amount of money are printed on a receipt for delivery to the customer. The input means includes a correction key. Each time the correction key is depressed, the information stored in the second register is cleared sequentially one merchandise item at a time. A corrected or other merchandise data is then stored in the cleared area of the second register.

BRIEF DESCRIPTION OF THE DRAWINGS

FIG. 1 shows an example of a receipt prepared in accordance with the present invention.

FIG. 2 shows a key arrangement on a keyboard.

FIG. 3 shows a block diagram of a retail terminal in accordance with one embodiment of the present invention.

DESCRIPTION OF THE PREFERRED EMBODIMENT

One embodiment of the present invention will now be explained with reference to the accompanying drawings.

FIG. 1 shows an example of a receipt issued by the present retail terminal. On a receipt 1, a merchandise code 2, a merchandise name 3, the amount of merchandise 8 and the amount of money or cost 4 are printed from left to right on each line for each item of merchandise. The merchandise code 2 is a code given to each item of merchandise to identify the merchandise. The merchandise having the same merchandise name, for example, "trousers" may be given different merchandise codes when long trousers and short trousers are included. The merchandise name is a name of merchandise such as "undershirt" or "trousers". The merchandise names are stored in a name table 21 to be described later. In the illustrated example, the merchandise code 2 "123", the merchandise name 3 "undershirt", the amount of merchandise "1" and the cost 4 "5000 (Yen)" are printed on the first line. Similar data is printed on the other lines. When the cost is to be corrected, a correction mark 5 "C" is printed and a minus sign "—" is printed before the amount of money data. A corrected input merchandise data 6 is printed on the following line. A total cost 7 is printed on the last line.

A configuration of the retail terminal is now explained. A keyboard for inputting the merchandise data described above is first explained. An arrangement of a keyboard 22 is shown in FIG. 2. The keyboard 22 comprises ten keys 40 including numeric keys 0-9 and a decimal point key, and function keys including a multiplication key 41, a correction key 42, a repeat key 43, a merchandise code key 44, an entry key 45, a total key 46 and keys 47 for inputting the date and other data. The ten keys 40 are used to input numeric data such as the merchandise code, the cost and the amount of merchandise. The correction key 42 inherent to the retail terminal is used to correct the inputted merchandise data, the repeat key 43 is used to repeatedly input the merchandise data, the merchandise code key 44 is used to identify the merchandise code numerics inputted by the ten-keys 40, the entry key 45 is depressed to enter the merchandise data for each item of the merchandise and the total key 46 is depressed to calculate a total after all of the merchandise data has been entered.

Referring now to FIG. 3, the retail terminal is provided with the keyboard 22 described above as an input device. Numeric data such as merchandise code 2, amount of merchandise 8 and cost 4 are inputted from the keyboard 22 and function information is keyed in from the merchandise key 44, the entry key 45 and the correction key 42. When sales data on the merchandise is entered, the input sequence of the data is generally predetermined. For example, when data on one item of merchandise is to be entered, a merchandise code is inputted from the ten keys and the merchandise key 44 is then depressed. Then, a unit price of the merchandise is inputted and the entry key 45 is depressed to complete the entry of the merchandise data on one item of the merchandise. When the data on a plurality of identical items of the merchandise is to be entered, the number of items is inputted by the ten keys after the depression of the merchandise key 44, and then the multiplication key 41 is depressed.

The numeric data and the function data inputted from the keyboard 22 are temporarily stored in a register 25. Of the data stored in the register 25, the numeric data is sent to a display 23 and a buffer register 32. The function data is sent to a controller 51.

The display 23 may be a well-known liquid crystal display and is used to allow the verification of the merchandise data to be entered by an operator and a customer. The display 23 displays the merchandise data sequentially loaded into the register 25 and a total cost from a sum register 24 to be described later.

The buffer register 32 temporarily stores the data including the merchandise code 22, the amount of merchandise 8 and the cost 4 sent from the register 25. The buffer register 32 also stores data from an input buffer register 11, merchandise names from a name table 21 and results of calcuation from a calculator 29.

In storing the merchandise code, the merchandise name, the amount of merchandise and the cost, a pointer 54 points to storage areas of that data.

The input buffer register 11 temporarily stores the merchandise data including the merchandise code 2, the merchandise name 3, the amount of merchandise 8 and the cost 4 for the respective items of the merchandise, which data is to be stored in the buffer register 32. The storage areas of the input buffer register 11 in which that data is to be stored are sequentially pointed to by a pointer 50.

The controller 51 controls the logic units. It updates the pointer 54 based on the function data sent from the register 25 and updates the pointer 50. It also updates an address register 53 to be described later.

The address register 53 specifies addresses of a sorting and summing memory 18, the name table 21 and a merchandise code table 55. The sorting and summing memory 18 stores the total cost and total amount of merchandise for each item of the merchandise or each merchandise code. The name table 21 stores the merchandise codes 2 and the corresponding merchandise names 3. The merchandise name 3 read out of the name table 21 is stored into the buffer register 32.

The merchandise code table 55 stores the merchandise codes 2, the name addresses 56 on the name table 21 corresponding to the merchandise codes 2 and the addresses 57 on the sorting and summing memory 18 corresponding to the merchandise codes 2.

A comparator 33 compares the merchandise code 2 stored in the buffer register 32 with the merchandise code 2 read from the merchandise code table 55.

The calculator 29 carries out an arithmetic operation based on the information including the cost of and the amount of merchandise sent from the buffer register 32, the sum register 24 and the sorting and summing memory 18.

The result of the calculation carried out in the calculator 29 is loaded into the sum register 24 or the buffer register 32. The information on the cost and the amount of merchandise in the sorting and summing memory 18 is sent to the calculator 29, and the calcualtion results of the cost and the amount of merchandise for each item of the merchandise are sent to the sorting and summing memory 18.

The sum register 24 stores the result of the calculation carried out in the calculator 29, among others the total cost.

A printer 28 is a conventional printer which prints out the output data from the buffer register 32 and the sum register 24. That data is printed out on a receipt in a manner as shown in FIG. 1.

The operation of the retail terminal thus constructed is now explained.

(1) Entry Operation

When the merchandise code 2 is inputted by the ten keys 40 on the keyboard 22 and the merchandise key 44 is depressed, the merchandise code 2 is loaded into the register 25 and also sent to the display 23. Upon depression of the merchandise key 44, the data of the merchandise code 2 in the register 25 is transferred to buffer register 32. The storage area of the buffer register 32 in which the merchandise code 2 is to be stored is pointed to by the pointer 54. After the merchandise code 2 has been stored in that storage area, the pointer 54 is updated to point to a storage area in which the next data, that is, the merchandise name 3 is to be stored. After an operator has depressed the merchandise key 44, the operator inputs a unit price of the merchandise (when one item of the merchandise is to be registered) or inputs the number of identical items, depresses the multiplication key and inputs the unit price of the merchandise (when a plurality of items of the merchandise are to be entered). During the keying operation by the operator, the merchandise name 3 is loaded on the buffer register 32.

When the merchandise key 44 is depressed, the controller 51 identifies it and determines that the merchandise code 2 has been loaded in the buffer register 32. Then the controller 51 activates and updates the address register 53. The address in the address register 53 is sequentially transferred to the merchandise code table 55 to sequentially read out the merchandise codes 2, which are then sent to the comparator 33.

On the other hand, the merchandise code 2 previously loaded in the buffer register 32 is also sent to the comparator 33, which compares those merchandise codes 2. The address register 53 is updated until the comparator 33 detects the compare equal. When the equality between the merchandise codes 2 is detected, the controller 51 responds to it to read out the name address 56 corresponding to the equal merchandise code 2 from the merchandise code table 55 and the name address 56 is loaded into the address register 53. The name address 56 in the address register 53 specifies the address on the name table 21. The merchandise name 3 corresponding to the merchandise code 2 is read out of the name table 21 and loaded into the buffer register 32. When the merchandise name 3 is loaded into the buffer register 32, the pointer 54 points to the storage area. After the merchandise name 3 has been loaded thereto, the pointer 54 is updated. In this stage, the buffer register 32 retains the merchandise code 2 and the merchandise name 3.

The subsequent operation differs depending on whether the number of items of the merchandise is one or more than one. When the data on one item of the merchandise is to be entered, the entry of the number of items is omitted and a unit price (a price of one item of the merchandise) is inputted from the ten keys. The unit price is temporarily stored in the register 25 and also sent to the display 23 for display. Thereafter, when the entry key 45 is depressed, the controller 51 responds thereto to analyze the content of the pointer 54 and the content of the register 25 to determine the omission of the entry of the number of items. Then, the controller 51 loads "1" into the storage area of the buffer register 32 which is pointed to by the pointer 54 and on which the number of items is to be loaded, and then updates the pointer 54. Then, the controller 51 loads the unit price data stored in the register 25 on the storage area of the buffer register 32 in which the cost is to be stored.

As the entry key 45 is depressed, it is regarded as the completion of the entry of the merchandise data on one item of the merchandise and the content of the buffer register 32 is sent to the printer 28, which prints out the data for one item of the merchandise on the receipt.

The content of the buffer register 32 is then transferred to the input buffer register 11. The input buffer register 11 has a plurality of storage areas each having an equal size to the buffer register 32. Each time the data in the buffer register 32 is loaded therein, the pointer 50 is updated. On the other hand, as the content of the buffer register 32 is transferred to the input buffer register 11, the pointer 54 is reset to the initial value and waits for the loading of the next merchandise data into the buffer register 32. In this manner, the merchandise data on one item of the merchandise is entered.

When the merchandise data on a plurality of the same items of the merchandise is to be entered, the merchandise key is depressed as described above and then the number of items data 8 is inputted by the ten keys 40. The number of items data 8 is temporarily stored in the register 25 and is also displayed on the display 23. When the multiplication key 41 is next depressed, the number of items data 8 is transferred from the register 25 to the buffer register 32. The storage area of the buffer register 32 to which the number of items data 8 is to be stored is pointed to by the pointer 54.

The unit price of the merchandise is then inputted from the ten keys 40 and loaded into the register 25. When the entry key 45 is next depressed, the unit price data in the register 25 is stored in the corresponding storage area in the buffer register 32. In this stage, the buffer register 32 retains the merchandise code, the merchandise name, the number of items of the merchandise and the unit price.

The unit price data and the number of items data in the buffer register 32 are then transferred to the calculator 29 where they are multiplied. The resulting product is stored as the sum amount of money of the merchandise in the unit price storage area in the buffer register 32.

In this manner, the merchandise code, the merchandise name, the amount of the merchandise and the total cost for one item of merchandise are loaded on the buffer register 32. The information therein is sent to the printer 28 for printout on the receipt. The content of the buffer register 32 is then transferred to the input data buffer 11. In this manner, the merchandise data on a plurality of the same items of merchandise is registered. When different sorts of merchandise are included, either one of the above operations is repeated and the merchandise data is stored in the input buffer register 11 for each item of the merchandise. The storage areas in the input buffer register 11 for the respective items of the merchandise are pointed to by the pointer 50.

(2) Correction Operation (2)-1 The correction of the content of the buffer register 32 before the depression of the entry key in entering the merchandise data is first explained.

When the correction is required during the loading of the merchandise data in the buffer register 32, the correction key 42 is depressed. The pointer 54 has not been reset and points to a storage area in the buffer register 32. The controller 51 detects the non-reset state of the pointer 54 and clears the contents of the buffer register 32 and the register 25. The pointer 54 is also cleared so that the entry of the merchandise data must start from the beginning. Since this is the correction made before the depression of the entry key 45, that is, before the content of the buffer register 32 is transferred to the input buffer register 11 and the printer 28, the content of the register 25 is displayed on the display 23 but it is not printed out by the printer 28.

(2)-2 The correction after the depression of the entry key 45, that is, after the content of the buffer register 32 to the input buffer register 11 is now explained. To correct the data, the correction key 42 is first depressed. The pointer 54 has been reset to "0" and the pointer 50 has not been reset to "0". The controller 51 responds thereto to read out the content of the storage area of the input buffer register 11 pointed to by the pointer 50, that is, the merchandise code 2, the merchandise name 3, the amount of merchandise 8 and the amount of money 4 and load them to the buffer register 32. After the data in that storage area has been read out, the pointer 50 is decremented by one to point to the immediately preceding storage area. The content of the buffer register 32 is sent to the printer 28, which prints out the data on the receipt together with the correction mark 5 (FIG. 1). At this stage, the merchandise data for one item of the merchandise is cleared from the input buffer register 11.

If further correction is required, the correction key 42 is depressed again. As a result, the merchandise data in the input buffer register 11 for one item of the merchandise which immediately precedes the data previously erased, that is, the data in the storage area pointed to by the pointer 50 is cleared in a similar manner and it is also printed by the printer 28.

By depressing the correction key 42 sequentially, the entered data in the input buffer register 11 for the respective items of the merchandise is sequentially cleared item by item. When corrected merchandise data is to be entered, the entry operation described above is carried out.

(3) Summing Operation of the Entered Data

After the entry operation or the correction operation described above, the total key 46 is depressed when the entry of the data of one case, that is, the data for several items of the merchandise purchased by one customer has been completed. As the total key 46 is depressed, the data in the input buffer register 11 is transferred to the buffer register 32 item by item. The merchandise code in the data for one item of the merchandise loaded into the buffer register 11 is pointed to by the pointer 54 and sent to the comparator 33.

On the other hand, as is the case of the entry operation, the address register 53 is sequentially updated so that the merchandise codes 2 stored in the merchandise code table 55 are sequentially transferred to the comparator 33, which compares the merchandise codes 2 sent from the merchandise code table 55 with the merchandise code sent from the input buffer register 11. If an equality therebetween is detected, the sorting and summing address 57 in the merchandise code table 55 corresponding to the equal merchandise code is read out and loaded into the address register 53. The sorting and summing memory 18 is accessed by that address and the total cost and the total amount of items of the merchandise corresponding to that merchandise code 2 are supplied to the calculator 29. On the other hand, the cost and the amount of merchandise stored in the buffer register 32 are also supplied to the calculator 29. The calculator 29 accumulates and updates the total cost and the total cost of merchandise. The updated total amount and total amount of merchandise are sent to the sorting and summing memory 18 and stored in the storage area allocated to that merchandise.

In the calculator 29, the cost data for that merchandise stored in the buffer register 32 and the content of the sum register 24 are added, and a resulting sum is returned to the sum register 24. In the initial condition, since the content of the sum register 24 is "0", the cost of the first item of the merchandise is loaded into the sum register 24 in the first run of calculation. Thereafter, the pointer 50 is decremented by one and the data for the next item of the merchandise is read into the buffer register 32. In a similar manner, the total cost and the total amount of merchandise in the sorting and summing memory 18 corresponding to the current merchandise code are updated, and the cost for that merchandise is added to the content of the sum register 24 in the calculator 29, and a resulting sum is stored in the sum register 24.

In this manner, the contents of the input buffer register 11 are sequentially read into the buffer register 32 until the content of the pointer 50 reaches "0", and the contents of the sorting and summing memory 18 are updated. A total of the costs of the respective items of the merchandise stored in the input buffer register 11 is retained in the sum register 24. The content of the sum register 24 is then displayed on the display 23 and the total cost is printed out on the receipt as shown in FIG. 1.

Where the retail terminal is connected to a central processing unit, the content of the input buffer register 11 is sent to the central processing unit through a line when the total key 46 is depressed.

In the explanation so far described, it is assumed that the data is printed out on the receipt or journal tape. The print operation on a sales slip instead of the receipt is now explained. When expensive merchandise is sold, the sales slip is used instead of the receipt.

The entry operation (1), the summing operation (3) and the print operation are identical except that the sales slip is used instead of the receipt. In the correction operation (2), it is desirable to cross out the cancelled item by a line because the sales slip is preformated. When the correction key is depressed, the data in the input buffer register 11 is loaded into the buffer register 32 and a correction code is added to the merchandise data to be cancelled, and it is sent to the printer 28 through the register 25 so that the data is printed out on the journal paper with the correction mark. The sales slip is shifted back by one line when the correction key is depressed, and the data sent to the printer 28 is replaced by a minus sign "—" so that the "—" sign is printed out in superposition to the data to be cancelled. The data for the one item of merchandise read out of the input buffer register 11 is cleared as is the case of the previous example. When the correction key is further depressed, the sales slip is shifted back by one line and the data is printed out on the journal tape with the correction mark and the "—" sign is overprinted on the sales slip. The entered data in the input buffer register 11 is sequentially cleared.

When corrected data is next keyed in from the ten keys or the total key is depressed, that is, when a key other than the correction key is depressed, the printer 28 shifts the sales slip forward by the number of lines previously shifted back and prints out the input merchandise data or the sum data.

The receipt printer and the journal paper printer usually do not have the shift-back function. Where the shift-back function is included in the receipt printer or the journal printer, the "—" sign can be overprinted on the data to be cancelled in the same manner as the sales slip printer.

The present invention is not limited to the illustrated embodiment and can be modified in various ways. For example, when the merchandise name need not be printed out, the name table 21 may be omitted.

We claim:

1. A retail terminal for registering data from various items of merchandise, comprising:
    (a) input means for inputting data for each item of merchandise, including at least a merchandise code, the cost of the merchandise, number of items of the merchandise, and function information;
    (b) first register means for temporarily storing at least the data inputted from said input means;
    (c) second register means for storing the merchandise data stored in said first register means for a plurality of items of the merchandise;
    (d) memory means connected to said second register means for storing total cost and total number of items of the merchandise for the respective items of the merchandise;
    (e) calculator means connected to said second register means and said memory means for calculating a sum amount of money and a total amount of the merchandise for each item of the merchandise;

(f) means for sequentially transferring the contents of said second register means to said first register means and for producing a visual output;

(g) control means for transferring the contents of said second register means to said first register means item by item based on said function information inputted from said input means and for clearing the merchandise data from said second register means item by item; and (h) pointer means connected to said control means for pointing to a storage area of said second register means to be allocated to a particular item of the merchandise.

2. A retail terminal for registering data for various items of merchandise, comprising:

(a) input means for inputting data for each item of merchandise, including at least a merchandise code, the cost of the merchandise, number of items of the merchandise, and function information;

(b) first register means for temporarily storing at least the data inputted from said input means;

(c) second register means for storing the merchandise data stored in said first register means for a plurality of items of the merchandise;

(d) memory means connected to said second system means for storing total cost and total number of items of the merchandise for the respective items of the merchandise;

(e) calculator means connected to said second register means and said memory means for calculating a sum amount of money and a total amount of the merchandise for each item of the merchandise;

(f) means for sequentially transferring the contents of said second register means to said first register means and for producing a visual output;

(g) control means for transferring the contents of said second register means to said first register means item by item based on said function information inputted from said input means and for clearing the merchandise data from said second register means item by item; and (h) pointer means connected to said control means for pointing to the merchandise code data, the cost data and the amount of merchandise data stored in said first register means.

* * * * *